United States Patent Office 3,135,308
Patented June 2, 1964

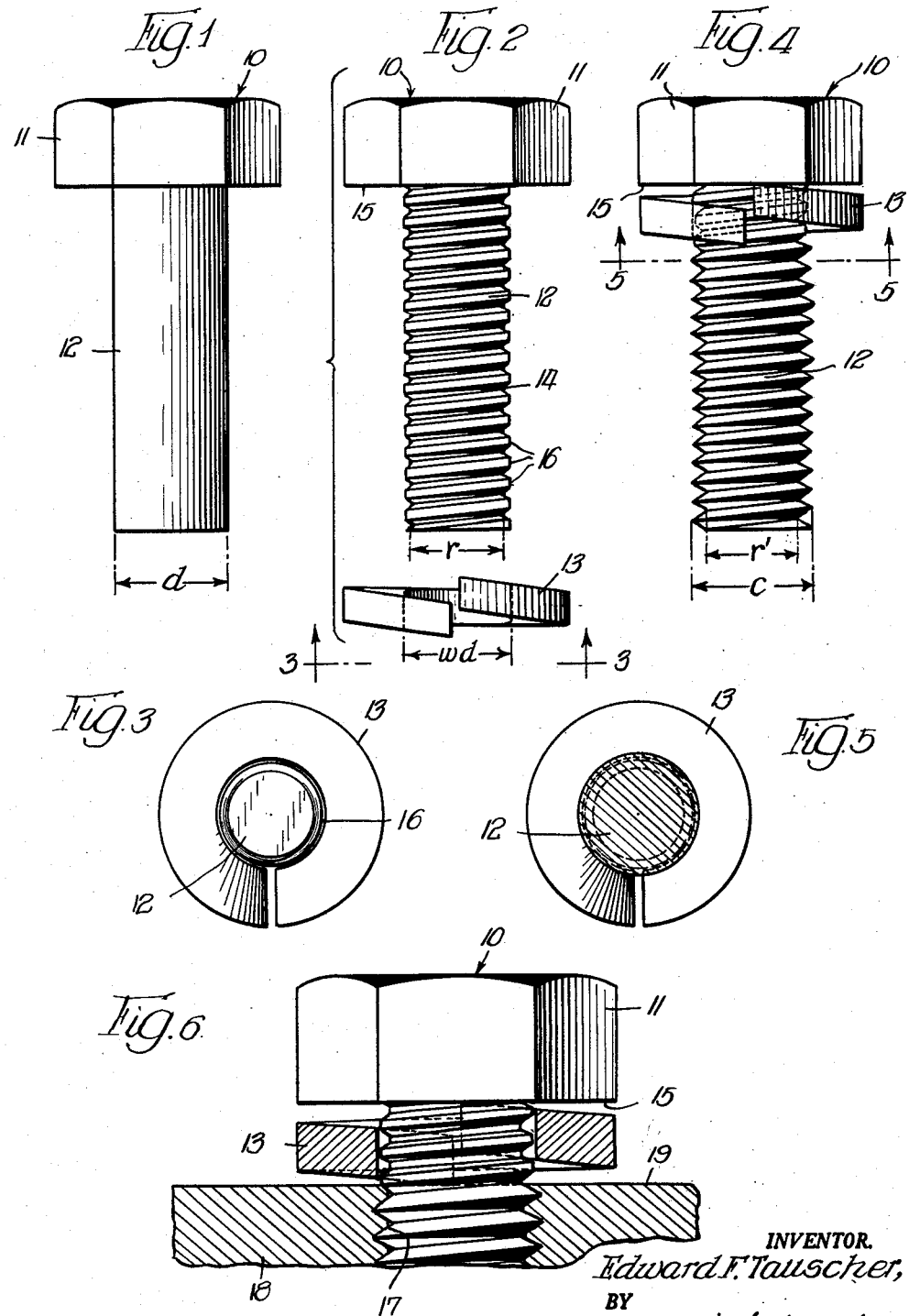

3,135,308
THREADED FASTENER AND RETAINED
WASHER
Edward F. Tauscher, Hillside, Ill., assignor, by mesne
assignments, to Allied Products Corporation, Detroit,
Mich., a corporation of Michigan
Filed July 14, 1960, Ser. No. 42,858
4 Claims. (Cl. 151—37)

This invention relates to threaded fastener and washer assemblies and is more particularly concerned with improvements in an assembly of the type wherein a lock washer is permanently associated with the fastener prior to the application of the fastener to a work piece.

Machine screw or bolt and washer assemblies have heretofore been provided with the washer being held in permanent association with the screw or bolt by the threads on the stem of the latter. It has been the general practice in providing such assemblies to position the washer on the stem forming portion of a screw blank prior to rolling the threads thereon with the washer having an internal diameter only slightly greater than the diameter of the stem so that when the threads are rolled the crests or peaks have a greater diameter than the internal diameter of the washer and the latter is trapped in assembled relation adjacent the head of the screw and held against separation from the same by the threads. With this procedure, the threads do not extend to the underface of the head of the screw but terminate at the washer leaving a small unthreaded section of the stem on which the washer is retained by the threads which have a greater crest diameter than the internal diameter of the washer. The root diameter of the threads is substantially less than the diameter of the unthreaded portion of the stem which carries the washer and when the washer is an axially compressible type, for example, a lock washer, and the screw is inserted in a tapped opening, the screw cannot be turned all the way home so as to make the lock washer effective because the screw will bind when the unthreaded portion reaches the edge of the threaded opening. In order to overcome this difficulty, the opening has been made oversize at the entrance end or some arrangement has been provided for cutting away the edge of the opening to accommodate the unthreaded portion of the screw. However, this involves an extra operation in preparing the hole for such an assembly and it has long been recognized that it would be advantageous to provide a screw or bolt and lock washer assembly in which the screw could be turned all the way home into an aperture having a standard thread extending to the entrance edge of the aperture. It is a general object of the present invention, therefore, to provide a machine screw or bolt and lock washer assembly in which the washer is trapped on the stem of the screw adjacent the head by the threads on the screw and the latter is capable of being turned into the opening so that it is tightly seated without any interference with the threads adjacent the entrance to the opening.

It is a more specific object of the invention to provide a screw and lock washer assembly wherein the washer is retained in assembled position on the screw by the threads with the portion of the screw which carries the lock washer being partially threaded so that the screw is free to move axially into a threaded opening in a work piece the full depth of its stem and without any interference as the lock washer is tightened between the screw head and the surface of the work piece.

It is a further object of the invention to provide a method of forming a screw fastener and lock washer assembly wherein a screw blank is provided having a stem of predetermined diameter somewhat less than the internal diameter of the washer, the threads are rolled on the stem of the screw so that an intermediate root diameter is obtained and the crests are only partially formed leaving a flat peripheral surface, the washer is then assembled with the screw over the partially formed threads and finally the rolling of the threads is completed between the face of the washer and the free end of the stem so as to provide finished threads which have full root diameter and a crest diameter greater than the internal diameter of the washer and thereby the washer is retained in assembled relation on the stem of the screw.

These and other objects and advantages of the invention will be apparent from a consideration of the fastener and washer assembly and the method of forming the same which are illustrated in the accompanying drawings and hereinafter described.

In the drawings:

FIGURE 1 is an elevation of a screw blank suitable for forming a threaded machine screw or bolt type fastener;

FIGURE 2 is an elevation of the screw blank on which the threads have been partially rolled with a lock washer in position for assembly on the partially threaded stem of the blank;

FIGURE 3 is a bottom plan view taken on the line indicated at 3—3 on FIGURE 2;

FIGURE 4 is an elevation showing the screw and washer in its final assembled condition;

FIGURE 5 is a sectional view taken on the line 5—5 of FIGURE 4; and

FIGURE 6 is a sectional view illustrating the use of the screw and lock washer assembly.

Referring first to FIGURE 1, there is illustrated a blank 10, of metal or other suitable material, for forming a headed machine screw or bolt which comprises a head 11 and a cylindrical stem or shank 12 having a uniform diameter which is indicated at $d$.

The blank 10 is initially prepared for receiving a washer, for example, the split ring lock washer 13, by rolling the threads 14 on the stem 12, with the threads extending from the free end of the stem 12 to the underface 15 of the screw head 11. The initial thread rolling operation results in the stem 12 having spiral threads 14 separated by shallow grooves having a root diameter as indicated at $r$ (FIGURE 2) and with the crests or peaks as indicated at 16 being flat, or with the threads having a cross section in the form of a truncated triangle. The internal diameter $wd$ of the washer 13 is slightly greater than the maximum external diameter of the partially formed threads on the stem 12. The washer 13 is slipped over the partially rolled threads on the stem 12 to a position adjacent the underface 15 of the head 11. Thereafter, the rolling of the threads which extend from the open face of the washer 13 to the free end of the stem 12 is completed by the necessary rolling operation to eliminate the flat surfaces 16 on the crests of the threads and to bring these surfaces to a point so that the normal crest diameter $c$ (FIGURE 4) is obtained, the latter being greater than the internal diameter $wd$ of the washer 13 whereby the washer 13 is retained or trapped in permanently assembled relation immediately beneath the head 11 of the assembly. The initial thread rolling operation provides the root diameter $r$ (FIGURE 2) which is greater than the final root diameter $r'$ (FIGURE 4) desired for the finished thread. The thread is rolled finally to provide the desired standard machine thread size and form.

The initial thread rolling operation may be accomplished with a thread rolling die which has thread forming ridges and grooves of the proper size and form to provide the finished thread desired with the die being modified by grinding off or otherwise removing the outermost portions of the ridges so that when the initial thread is rolled the root diameter ($r$ in FIGURE 2), that is, the diameter of the grooves is greater than the full root diameter (r' in FIGURE 4) of the finished or fully rolled thread. The second or final thread rolling operation is performed with a die of the same size but without any modification so as to provide a final thread having the thread form and root and crest diameters of the proper values to provide a standard machine screw thread.

In using the screw and washer assembly of the present invention, the threaded outer portion of the stem 12 is inserted in an aperture 17 (FIGURE 6) in a plate 18, or like member, with the aperture 17 being tapped to provide standard machine screw threads extending in a normal manner to the edge of the opening, the latter coinciding with the top surface 19 of the plate or work piece 18. The tapped threads in the aperture 17 are the proper form and size to mate with and receive the threads on the screw. These threads will provide sufficient clearance for non-binding movement of the screw as it is rotated and moves into the aperture. The innermost edges of the threads are not brought to a point by normal tapping operations but these edges are left somewhat flat as indicated in FIGURE 6 with the result that they will not extend to the full depth of the grooves in the finally rolled threads on the stem of the fastener 10 and will not bind in the grooves in the partially rolled threads beneath the washer 13. Thus the screw 10 may be axially rotated to move it into the opening 17 without any interference from the material in the portion of the stem which is beneath the washer 13 so that the washer 13 may be tightened between the undersurface 15 of the head 11 and the top surface 19 of the work piece 18, thereby rendering the washer 13 effective as a locking element to prevent accidental rotation of the screw 10 in the direction to loosen the same.

While particular materials and specific details of construction have been referred to in describing the form of the fastener and washer assembly which is illustrated, it will be understood that other materials and different details of construction may be resorted to within the spirit of the invention.

I claim:

1. A machine screw and lock washer assembly which comprises a screw having a head and a cylindrical shank extending therefrom, said shank having rolled threads of the same thread form extending from the innermost face of the head to the free end of the shank, the threads immediately adjacent the innermost face of the head being partially formed with a crest diameter less than the crest diameter of the finished thread, the remaining threads being rolled so that the crest diameter of the finished thread is greater than the partially formed threads adjacent the head, and an axially collapsible lock washer having a uniform internal diameter which is greater than the maximum diameter of the partially formed threads and less than the diameter of the finished threads positioned on the shank adjacent the head with the internal periphery of the washer defining a cylindrical surface having an axial thickness greater than the pitch of the finished thread so that the washer is prevented from rotationally mating with the finished thread.

2. A screw and washer assembly comprising an axially collapsible washer having a uniform internal diameter and a screw having a head and a shank of uniform diameter extending therefrom, said shank being threaded from the inner face of the head to the free end of the shank with the threads being of the same thread form and with the threads immediately adjacent the inner face of the head having a maximum diameter silghtly less than the internal diameter of the washer, the washer being assembled on the shank of the screw adjacent the head, the portion of the shank of the screw extending from the innermost face of the washer to the free end of the shank being fully threaded with a crest diameter larger than the internal diameter of the washer and the maximum diameter of the threads adjacent the head so as to trap the washer in assembled relation on the threaded portion of the screw shank adjacent the head and the washer having an internal periphery which defines a cylindrical surface having an axial thickness greater than the pitch of the finished threads on the fully threaded portion of the shank whereby the washer is prevented from rotationally mating with the finished thread.

3. A machine screw and lock washer assembly comprising a screw having a head and a cylindrical shank extending therefrom which is threaded from the inner face of the head to the end of the shank with the threads having the same thread form and with the threads immediately adjacent the inner face of the head having a crest diameter slightly less than the internal diameter of the washer so as to accommodate the washer, the washer being of the axially collapsible type with a uniform internal diameter and being assembled on the shank of the screw adjacent the head and the portion of the shank which extends from the inner face of the washer toward the free end of the shank having a finished thread with a crest diameter larger than the internal diameter of the washer and the internal periphery of the washer defining a cylindrical surface having an axial thickness greater than the pitch of the finished thread whereby the washer is trapped in assembled relation with the screw and prevented from rotationally mating with the finished thread.

4. A threaded fastener and washer assembly comprising a fastener having a head and a cylindrical stem extending therefrom, said stem being of uniform diameter and being fully threaded from the innermost face of the head to the end of the stem with the threads having the same thread form, the threads immediately adjacent the inner face of the head having a maximum external diameter slightly less than the internal diameter of the washer so as to accommodate the washer, the washer being of the axially collapsible type with a uniform internal diameter and assembled on the stem of the fastener adjacent the head, the threads on the portion of the stem of the fastener which extends from the exposed face of the washer to the end of the stem having a crest diameter which is larger than the internal diameter of the washer and the maximum diameter of the threads immediately adjacent the head, the internal periphery of the washer defining a cylindrical surface having an axial thickness greater than the pitch of the threads extending from the exposed face of the washer whereby the washer is trapped in assembled relation with the fastener and prevented from rotationally mating with the threads extending from the exposed face of the washer.

References Cited in the file of this patent

UNITED STATES PATENTS

| | | |
|---|---|---|
| 721,559 | Goodridge | Feb. 24, 1903 |
| 1,908,215 | Berge | May 9, 1933 |
| 2,113,425 | Crowther | Apr. 5, 1938 |
| 2,277,852 | Golden | Mar. 31, 1942 |
| 2,289,066 | Olson | July 7, 1942 |
| 2,672,069 | Mitchell | Mar. 16, 1954 |

FOREIGN PATENTS

| | | |
|---|---|---|
| 861,940 | Germany | Nov. 13, 1952 |